United States Patent [19]

Kobayashi et al.

[11] Patent Number: 4,701,222
[45] Date of Patent: Oct. 20, 1987

[54] PROCESS FOR PRODUCING AN ARTIFICIAL LIGHT-WEIGHT AGGREGATE

[75] Inventors: Waichi Kobayashi; Seiji Akegi; Kazuhiro Iwata, all of Ube, Japan

[73] Assignee: Ube Industries, Ltd., Ube, Japan

[21] Appl. No.: 818,875

[22] Filed: Jan. 14, 1986

[30] Foreign Application Priority Data

Jan. 14, 1985 [JP] Japan ................................. 60-5257

[51] Int. Cl.$^4$ ............................................. C04B 18/06
[52] U.S. Cl. .................................. 106/288 B; 106/97; 106/DIG. 1; 264/66; 501/125; 501/128
[58] Field of Search ............... 106/97, DIG. 1, 288 B; 501/128, 125; 264/66

[56] References Cited

U.S. PATENT DOCUMENTS

| | | | |
|---|---|---|---|
| 2,948,948 | 8/1960 | Duplin, Jr. et al. | 106/DIG. 1 |
| 3,830,776 | 8/1974 | Carlson et al. | 106/DIG. 1 |
| 3,961,973 | 6/1976 | Jones | 106/98 |
| 4,490,178 | 12/1984 | Loggers et al. | 106/DIG. 1 |

FOREIGN PATENT DOCUMENTS

| | | | |
|---|---|---|---|
| 2058736 | 4/1981 | United Kingdom | 106/DIG. 1 |
| 734162 | 5/1980 | U.S.S.R. | 106/DIG. 1 |

*Primary Examiner*—Steven Capella
*Attorney, Agent, or Firm*—Frishauf, Holtz, Goodman & Woodward

[57] ABSTRACT

A process for producing an artificial light-weight aggregate comprising $SiO_2$, $Al_2O_3$, $Fe_2O_3$ and at least one oxide selected from the group consisting of MgO and CaO which has an absolute dry specific gravity of not higher than 1.5, a crushing strength of not less than 55 kgf/cm$^2$ and a 24 hour water-absorption ratio of not greater than 2.4%. The process comprises granulating a raw powder material comprising $SiO_2$, $Al_2O_3$, $Fe_2O_3$ and at least one oxide selected from the group consisting of MgO and CaO, in which the total amount of $SiO_2$ and $Al_2O_3$ is from 75 to 92 wt. %, the weight ratio of $Al_2O_3/SiO_2$ is from 0.25 to 0.70, and the total amount of $Fe_2O_3$ and MgO and/or CaO is from 6-20 wt. % and containing at least 80% by weight of a coal ash having a Blaine specific surface area of 2,000 to 9,000 cm$^2$/g to give granules having an average apparent specific gravity of 1.1 to 1.8 and a crushing strength of 0.5 kgf/cm$^2$ or above at 20° C. as well as after heating at 600° C. The granules are calcined at a temperature of 1,100° to 1,600° C. by heating the granules to said temperature at a rate of 150° C./hour to 1000° C./hour when heating said granules from 600° to said temperature.

7 Claims, No Drawings

PROCESS FOR PRODUCING AN ARTIFICIAL LIGHT-WEIGHT AGGREGATE

BACKGROUND OF THE INVENTION

1. Field of the Invention

The present invention relates to an artifical lightweight aggregate, and a process for producing the same.

2. Description of Prior Arts

The consumption of coal has greatly increased with increase of the use of coal as an energy source in the recent years. As a result, there has been proposed a problem in the disposal of coal ash formed thereby, and hence, it is greatly desired to effectively utilize the coal ash.

There has recently been a tendency that structures such as buildings are made more weight-saving and heat-insulating from the viewpoints of energy-saving and resource-saving and the viewpoint of improving the earthquake-proofness. Accordingly, an artificial lightweight aggregate (hereinafter, sometimes, referred to as ALA) of excellent quality appropriately employable for manufacturing lightweight concrete articles and a process for inexpensively producing the improving lightweight aggregate has been eagerly demanded.

Heretofore, various processes for producing ALA form coal ash as a main raw material have been proposed. These processes are disclosed, for instance, in Japanese Patent Publication Nos. 36(1961)-12580, 38(1963)-25820, 40(1965)-16270, 41(1966)-8239 and 47(1972)-47572, and Japanese Patent Provisional Publication No. 57(1982)-11866. However, the production of ALA from coal ash as a main raw material in Japan has not been industrially done as yet, mainly because there are disadvantages that a coal ash ALA produced by the above-mentioned known process is not economical in its manufacturing and inferior in quality as compared with expanded shale ALA commercially available in Japan (hereinafter referred to as commercially available ALA).

Certain comfirmative experiments of the processes for the production of ALA from coal ash which are disclosed in the aforementioned Patent Publications have been made by the present inventors. As a result, it has been found that as compared with the producing process of the commercially available ALA, the above-described processes have disadvantages in that a large amount of one or more auxiliary materials such as clay, shale, debris, feldspar, pulp waste liquor, magnesia and water glass must be added (uses of these auxiliary material are not economical), and a large amount of water must be used in granulating the raw material containing the auxiliary material so that an extra amount of fuel is comsumed for drying and hence, the cost of fuel is high. Further, it has been found that the ALA produced from coal ash by the known method has a low strength as an aggregate and a high water absorption so that the ALA is inferior in quality. Further, even if a lightweight aggregate of good quality could be obtained on a laboratory scale by the above-described processes, they had much difficulty in stably producing the aggregate on industrial scale and hence, there is a problem in industrialization.

SUMMARY OF THE INVENTION

It is an object of the present invention to provide a new artificial lightweight aggregate which is enhanced in the crushing strength and is highly reduced in the water-absorption.

It is another object of the invention to provide a process for economically producing the improved artificial lightweight aggregate.

It is a further object of the invention to provide a process for producing the improved artificial lightweight aggregate, which can simultaneously meet two requirements for the effective utilization of coal ash and for an increase in the demand for an artificial lightweight aggregate of good quality.

There are provided by the present invention an artificial lightweight aggregate comprising $SiO_2$, $Al_2O_3$, $Fe_2O_3$ and at least one oxide selected from the group consisting of MgO and CaO, in which the total amount of $SiO_2$ and $Al_2O_3$ ranges from 75 to 92 wt.%, a weight ratio of $Al_2O_3/SiO_2$ ranges from 0.25 to 0.70, and the total amount of $Fe_2O_3$ and MgO and/or CaO ranges from 6–20 wt.%, which has an absolute dry specific gravity of not higher than 1.50, a crushing strength of not less than 55 $kgf/cm^2$, preferably not less than 60 $kgf/cm^2$ and a at 24 hour water-absorption ratio of not greater than 2.4%, preferably not greater than 2.0%.

The present invention further provides a process for producing the improved artificial lightweight aggregate of the invention, which comprises:

granulating a raw powdery material comprising $SiO_2$, $Al_2O_3$, $Fe_2O_3$ and at least one oxide selected from the group consisting of MgO and CaO, in which the total amount of $SiO_2$ and $Al_2O_3$ ranges from 75 to 92 wt.%, a weight ratio of $Al_2O_3/SiO_2$ ranges from 0.25 to 0.70, and the total amount of $Fe_2O_3$ and MgO and/or CaO ranges from 6–20 wt.% and containing at least 80% by weight of a coal ash having a Blaine specific surface area of 2,000 to 9,000 $cm^2/g$ to give granules having an apparent specific gravity of 1.1 to 1.8 and a crushing strength of 0.5 $kgf/cm^2$ or above, preferably 1.5/$cm^2$ or above, at 20° C. as well as after heating at 600° C.; and calcining the granules at a temperature of 1,100° to 1,600° C.

In the specification, the term "absolute dry specific gravity" means "specific gravity" determined under the absolute dry condition. The values of crushing strength are values determined in the form of granules or aggregates having an average diameter of 10±1 mm. The 24 hour water-absorption ratio is a water-absorption ratio determined after the aggregate is immersed in water at room temperature (20° C.) for 24 hrs.

DETAILED DESCRIPTION OF THE INVENTION

The present inventors have studied the reason why a lightweight aggregate of good quality can not be obtained when coal ash is used as a raw material in the prior arts. As a result, the inventors have found that the coal ash-containing material is very different from the conventional expanded shale material in the physical properties of the briquetted (molded) granulea to be fed to a calcining furnace, the physical properties of the granules obtained from the coal ash-containing material are out of values suitable for calcining, and when such granules of poort quality are calcined, the resulting product is inferior in quality and a stable production can not be performed.

Accordingly, the inventors have further studied physical values suitable for calcining and examined the preparation of a granule molded (briquetted) from coal ash based on said physical values.

Coal ash powder such as fly ash has powder characteristics different from those of the conventional rock, shale and clay in that:

(1) the particles of coal ash have been heated at a high temperature;

(2) the particles are spherical and hence, the adhesion between the particles is very poor;

(3) the particles are in the form of fine powder and the dense filling of the powder can be hardly made; and (4) the particles contain unburnt residue.

As a result, it has been found that a coal ash granule molded by the conventional method such as pan granulation is unsuitable for use in the calcination to give a lightweight aggregate of good quality, because such a granule has generally a low apparent specific gravity, a high water content and a low strength. It has also been found from experiments on industrial scale that particularly when granules containing unburnt residue (composed mainly of carbon) are heated at a temperature of 400° to 700° C., the unburnt residue is burnt and as a result, lowering in the strength of the coal ash granules and then the burst of the granules take place and the calcination becomes difficult or almost impossible.

For instance, when fly ash is granulated by a granulating method using a pan type granulator in the presence of water, which is a typical method for producing the conventional ALA, the resulting granules has an average apparent specific gravity of 0.9 to 1.1 (determined according to JIS-M8716-77), a water content of 20 to 40% and a crushing strength of 0.1 to 0.3 kgf/cm$^2$ (determined in the form of granules having an average diameter of 10 mm, according to JIS-M8718-76), while an expanded shale granules have an average apparent specific gravity of 1.4 to 1.9, a water content of 14 to 18% and a crushing strength of 3 to 5 kfg/cm$^2$. Hence, the granules obtained from fly ash are greatly inferior in the quality to the expanded shale granule.

The difference in apparent specific gravity between the granules to be calcined greatly affects the calcining stage. For instance, when the absolute dry specific gravity (which is not far from the apparent specific gravity measured according to JIS-A5002) of a calcined ALA is to be made 1.25, the granules undergo change in the volume such that when the expanded shale granule is to be calcined, its volume is expanded in the course of calcining (hereinafter referred to as expansion calcining) to allow its apparent specific gravity to change from about 1.6 to 1.2, while when the coal ash granule prepared by the conventional process is to be calcined, its volume must be reduced in the course of calcining (hereinafter referred to as reduced calcining) to allow its apparent specific gravity to change from the range of 0.9-1.1 to 1.25. Further, the coal ash granule prepared by the conventional process has a high water content so that the consumption of fuel increases and a great number of vapor passages are formed within the particles by the evaporation of water. Since the granules undergo reduction calcining, these passages are liable to be left to serve as permeating voids so that deterioration in the quality of the product such as an increase in the water absorption of the product and reduction of the strength of the resulting aggregate is caused. Further, it has been found that since the strength of the granules to be calcined is low, the granules are easily pulverized or burst in an industrial calcining furnace so that calcining can not be stably carried out, and lowering in the yield and quality of the product is caused.

The present inventors have made experiments, taking the above-described matters into consideration. As a result, it has been found that a coal ash ALA of good quality can be produced even by using the conventional calcining method, when the raw material adjusted under the specific conditions is granulated to give an apparent specific gravity of a molded (briquetted) granule to be calcined, said apparent specific gravity being not so much lower than the absolute dry specific gravity of the ALA product (preferably said apparent specific gravity being equal to or higher than the absolute dry specific gravity of the ALA product, but said apparent specific gravity being not higher than 1.8) and so as to form a molded (briquetted) granule having a crushing strength of 0.5 kgf/cm$^2$ or above, preferably 1.5 kgf/cm$^2$ or above at room temperature (at 20° C.) as well as after heating at 600° C.

The term "coal ash" used herein refers to solids which are left as residues after the combustion or the gasification of coal. Examples of such solids (coal ash) include fly ash, cinder ash, bottom ash, clinker ash and coal ash slag.

Further, it is pointed out that the raw material employable for the preparation of the artifical lightweight aggregate is not limited to coal ashes, but any other raw materials can be employed, as far as such raw materials contain the component in the specific range and are in the form of the particulate in the range specified in the claim. For instance, expanded shale and expanded clay can be employed, as far as they satisfy the conditions specified in the claim.

As the molding method for obtaining the granules of the present invention, the compression molding is preferred. Preferably, the coal ash is processed to adjust its physical conditions to have the following values and molded or briquetted by a continuous compression molding machine such as a briquetting machine.

Coal ash used as a main component for the raw powdery material is subjected to a processing such as mixing or crushing so as to have a Blaine specific surface area of 2,000 to 9,000 cm$^2$/g, more preferably 4,000 to 9,000 cm$^2$/g, more preferably 4,000 to 7,000 cm$^2$/g. When the Blaine specific gravity is too low, it will often be necessary to add a high-melting additive which functions as a binder. As far as the Blaine specific gravity is within the range of 4,000 to 9,000 cm$^2$/g, no additive will generally be required, though the necessity will depend on the type of the employed coal ash. It is not preferred to have a Blaine specific gravity of higher than 9,000 cm$^2$/g, because cost for crushing increases. When the Blaine specific gravity is lower than 4,000 cm$^2$/g, it is necessary to increase the amount of the additive. When the Blaine specific gravity is lower than 2,000 cm$^2$/g, the additive is advantageously used in an amount of 10% or above. Therefore, such a low Blaine specific gravity is not advantageous.

When the absolute dry specific gravity of ALA to be produced should be 1.2, the pressure conditions of the molding machine are chosen so that the molded (briquetted) granules to be calcined (hereinafter referred to as granule) will have an apparent specific gravity (average) of 1.1 to 1.8, preferably 1.2 to 1.6. When the apparent specific gravity is below 1.5, the granules undergo the reduction calcining, while when the apparent specific gravity exceeds 1.8, power required for molding is extremely increased. Thus, such an apparent specific gravity outside the range specified above is not advantageous.

The molding (briquetting) conditions such as molding pressure, molding speed, etc. of the molding machine are so controlled as to give granules having a crushing strenth (determined according to JIS-M8718-76, method for determining the crushing strength of iron pellet) of 0.5 kgf/cm$^2$ or above, preferably 1.5 kgf/cm$^2$ or above at room temperature and 600° C. Further, the additive may be added, depending on the type of coal ash employed.

It is necessary that the above-defined crushing strength be essentially kept in the course of calcining until the granule is dried and calcined in the calcining furnace. It has been found that the coal ash granule of the invention is different from the coal ash granule in the conventional process in which a powdery material such as clay, shale or slate is added to produce ALA to impart to granule a high crushing strength. The high strength can be retained even at a high temperature. The coal ash granule molded by the conventional process causes lowering in strength at a temperature of 400° to 700° C., almost loses its strength depending on the type of coal ash and burst into powders in the calcining furnace. This phenomenon is not caused, when the granule is calcined in a stationary electric furnace in a laboratory. A continuous calcining experiments have been made in a rotary kiln, and it has been found that if the granule has a crushing strength of 0.5 kgf/cm$^2$ or above, preferably 1.5 kgf/cm$^2$ or above after drying or heating at 600° C. for 30 minute, the granule is hardly pulverized in the calcining furnace and can be continuously calcined. Particularly, as far as the crushing strength is 1.5 kgf/cm$^2$ or above, fusion is not caused in the calcining zone and a long-term operation can be stably done.

It is one aspect of the present invention that the powdery raw material is granulated so as to give a granule having a crushing strength of 0.5 kgf/cm$^2$ or above even after heating at 600° C. and an apparent specific gravity of 1.1 to 1.8 and the granule is calcined without causing an increase in the specific gravity of the granule (preferably, expansion calcining in which the specific gravity is kept equal or is lowered). It has been found that it is important to regulate the particle size (Blaine specific surface area) of the coal ash or other powdery raw material to have a specific range, to choose the type of the additive and control the amount thereof and it is preferred to use a compression molding method as the granulating-molding method. The additive is used when the crushing strength does not reach 0.5 kgf/cm$^2$ at 600° C. An inorganic material is preferred as the additive. Examples of the additive include clay, shale, limestone soil, water grass, pulp waste liquor, sludge or slake lime is added in an amount of not more than 20% by weight, preferably not more than 10% by weight on a solid basis.

In carrying out the compression molding method, not more than 20% by weight, preferably 2 to 10% by weight of water is added to thereby keep the crushing strength of the granule at room temperature 0.5 kgf/cm$^2$ or above. Generally, when the amount of water to be added is not more than 1% by weight, the molding pressure becomes 5 t/cm$^2$ or above and the workability of the apparatus is lowered, though it is not necessary to add water depending on the type of coal ash. The preferred amount of water is from 2 to 10% by weight, because the crushing strength greatly increases in such water content range. An amount exceeding 10% by weight is not preferred from the viewpoints of thermal energy and quality in the product. Further, when such an amount exceeding 10% by weight is added, a bursting phenomenon sometimes takes place by the rapid heating of the granule.

Any compression molding machine may be used, so far as it belongs to a continuous type machine. A briquetting machine, a compression roller machine and a simple tablet machine can be used. Since it is necessary that the ALA product has a particle size distribution of a certain width, it is desired to give the breadth of the distribution in the size of molding frames and optionally to granulate the molded (briquetted) product.

Preferably, the particle of the ALA product should be in the shape of an egg or almond rather than a true sphere to prevent the resulting aggregate from being separated from the formed concrete and to impart to the concrete the advantageous properties.

Particular advantages in using the compression molding method are that the desired granule shape can be easily formed, that is, an ideal shape and an ideal particle size distribution can be obtained and a water content can be lowered to 10% by weight or below so that the bursting phenomenon can be effectively prevented. Further, the granule can be directly introduced into the calcining furnace without using any drying machine for the granule.

Since the coal ash, particularly fly ash has a high void volume in the powdery form, the coal ash powder is preferably pre-compressed, for example, compressed by a compression roller machine to reduce the void content and simultaneously to have the powdery raw material compression-molded (briquetted), whereby the physical properties of the molded article is further improved and the production yield increases.

After the compression-molded (briquetted) granules are screened to remove undesired fine particles, the granules are introduced into the calcining stage. The removed fine particles are generally recovered and again compression-molded.

A method using the conventional pan type granulator was examined as a granulating-briquetting method. As a result, it has been found that when a coal ash is finely crushed into a powder having a Blaine specific surface area of 4,000 to 9,000 cm$^2$/g and the powder is granulated, there can be obtained a granule whose apparent specific gravity and crushing strength at room temperature and 600° C. are improved to correspond to values suitable for calcining, even when a rolling granulating method using a pan type granulator is applied.

Preferably, the granule (the moled product) is calcined by a rotary kiln process from the viewpoint of the quality of the product. So long as the granule has the above-described physical properties, any of the conventional calcining furnaces and the conventional calcining methods may be used without particular limitation. However, since the chemical compositions and melting points vary depending on the type of coal ash, it is desirable to previously determine calcining temperature by carrying out a calcining test in an electric furnace. This is because it is necessary to change the calcining temperature depending on the type of coal ash. The experiments have showed that the calcining temperature preferably is from 1,100° to 1,600° C. and the retention time preferably is from 30 to 120 minutes.

It has now been found that the calcination of the granules is preferably performed at increasing temperatures in which the rate of the temperature increase ranges from 150° to 1,000° C./hour in the stage of heating at a temperature of higher than 600° C. The lightweight aggregate produced by the calcinated heated in this manner shows further improved properties, that is, high crushing strength and low water absorption.

After the calcination is complete and the product is cooled, water is sprayed over the calcined product of water. The resulting lightweight aggregate is then shipped as an artificial lightweight aggregate (ALA) for the use in manufacturing buildings, etc.

The ALA obtained by the process of the invention is mainly composed of a coarse aggregate. However, a fine aggregate having a particle size of 0.3 to 2.5 mm may be mixed, and the calcination can be satisfactorily carried out in the presence of such fine aggregate, as far as the amount of the fine aggregate does not exceed about 10% by weight.

The characteristic feature of the artificial lightweight aggregate of the present invention is that the quality of the product is improved as seen from the working examples given hereinafter. According to the process of the present invention, ALA can be produced from coal ash or other material, said ALA being superior in quality to commercially available products obtained from expanded shale. Particularly, an artificial lightweight aggregate of the invention has the following advantageous properties:

(1) water absorption is remarkably low and further, water absorption under pressure is low so that it has a good pumping property, and the resulting ready-mixed concrete advantageously has a low volume/weight ratio; and (2) the resulting ready-mixed concrete advantageously has a low air-dried specific gravity and its 28 days' compression strength is 500 kgf/cm$^2$ or above.

By the latter property, the concrete prepared using the lightweight aggregate of the invention finds a wide variety of uses such as secondary product in addition to the lightweight concrete for buildings.

The following examples and comparison examples will further illustrate the present invention.

EXAMPLE 1

80 parts by weight of fly ash (Coal ash A shown in Table 1) obtained from a boiler of a coal-fired steam power plant using coal from Australia, and 20 parts by weight of fly ash (Coal ash B shown in Table 1) obtained from a back pressure steam boiler using coal from Canada were mixed, and to the resulting mixture 10 parts by weight (outer proportion) of clay (shown in Table 1) was added. They were mixed in a 1.5 m$^3$-volume ribbon mixer.

The resulting powdery mixture was fed to a pan-type granulator provided with a pan (diameter: 1.5 m, angle of inclination: 50°, rotation: 10 r.p.m.) at a feed rate of 100 kg/hr and roll-granulated to produce granules having particle diameter of 5 to 15 mm, while spraying water over the mixture. The physical properties and the chemical compositions of the resulting granules are set forth in Tables 2 and 3, respectively.

The coal ash granules obtained above were calcined at a temperature of 1,330° C. and at a feed rate of 76 kg/hr (dry basis) in a midget rotary kiln (effective inner diameter: 0.9 m, effective length: 12 m, slope: 3.5/100). The yield of the coarse aggregate in the range of 5 to 15 mm of the calcined product was 91% based on the calcined granule and the remaining 9% was fine aggregate of 0.3 to 5 mm. The resulting artificial lightweight aggregate was subjected to the aggregate according to JIS-A5002-78. The results are set forth in Table 4.

COMPARISON EXAMPLE 1

A lightweight aggregate was prepared in the same manner as in Example 1 except that the incorporation of clay was omitted. The physical properties and the chemical composition of the resulting granules are set forth in Tables 2 and 3, respctively. The test results of the resulting aggregate are set forth in Table 4.

The yield of the calcined product of 5 to 15 mm was 75%. The test results are shown in Table 4. Since the specific gravity of the granules was 1.0 and the specific gravity of the calcined product was 1.19, the calcining was the reduction calcining.

COMPARISON EXAMPLE 2

A lightweight aggregate was prepared in the same manner as in Example 1 except that the expanded shale mass was employed as the raw material and no granulation was done. The physical properties and the chemical composition of the expanded shale mass are set forth in Tables 2 and 3, respectively. The test results of the resulting aggregate are set forth in Table 4.

EXAMPLES 2 TO 5

The procedure of Example 1 was repeated except that a brequetting machine equipped with a charging screw (roll diameter: 0.23, width: 0.08 m, mold claming pressure: 20 t) was used in place of the pan type granulator, and 0% of clay (Ex. 2), 5% of clay (Ex. 3) or 10% of clay (Ex. 5), or 5% of expanded shale (Ex. 4) was used.

The physical properties and the chemical compositions of the resulting briquetted granules are shown in Tables 2 and 3, respectively.

Then, artificial lightweight aggregates were prepared in the same manner as in Example 1.

The obtained artifical lightweight aggregate were subjected to the aggregate test. The test results are set forth in Table 4.

In the case that the compression molding method using the briquetting machine was employed, the apparent specific gravity of the granules exceeded 1.2 and the crushing strength exceeded 0.5 kgf/cm$^2$ even after the 600° C. heat-treatment. The yields of the calcined products were in the range of 80 to 93% based on the granules. The briquettes obtained using the briquetting machine where in the shape of an almond whch was suitable for use as an aggregate for incorporating into a concrete.

Three minutes' water absorption under a water pressure of 30 kgf/cm$^2$ were 15.2%, 8.8%, 11.2% and 7.3% in these Examples and remarkably low as compared with 33.0% in Comparison Example 2 (which was almost the same as the commercially available articles produced from expanded shale).

EXAMPLE 6

The procedure of Example 1 was repeated except that the raw material was replaced with Coal ash C which was crushed in a ball mill (diameter: 2 m×2 m) and granulated in a pan type granulator (diameter: 2.0 m, angle of inclination: 52°, rotation speed: 10 r.p.m.), a 80 m$^3$-volume blending silo was used as a mixer, and a rotary kiln (effective inner diameter: 0.9 m, effective length: 20 m, calcining rate: 1 m$^3$/hr) were used. The calcining temperature was kept at 1,240° C. so as to form an artificial lightweight aggregate having an absolute dry specific gravity in the range of 1.2 to 1.3.

TABLE 1-1

| Material | Blaine specific surface area ($cm^2/g$) | Loss on ignition (wt. %) |
|---|---|---|
| Coal ash A | 5080 | 3.1 |
| Coal ash B | 4720 | 1.3 |
| Coal ash C | 5510 | 3.4 |
| Expanded shale | 3100 | 2.6 |
| Clay | 3200 | 13.1 |

TABLE 1-2

| Material | Chemical Composition (wt. %) on ignition basis | | | | |
|---|---|---|---|---|---|
| | $SiO_2$ | $Al_2O_3$ | $Fe_2O_3$ | MgO + CaO | $Na_2O$ + $K_2O$ |
| Coal ash A | 58.8 | 32.6 | 4.1 | 3.4 | 1.1 |
| Coal ash B | 58.2 | 19.0 | 6.3 | 15.4 | 1.1 |
| Coal ash C | 56.5 | 32.8 | 4.3 | 3.8 | 1.4 |
| Expanded shale | 65.1 | 18.7 | 5.7 | 3.8 | 6.5 |
| Clay | 56.3 | 26.3 | 9.9 | 4.6 | 2.8 |

TABLE 1-3

| Material | $Al_2O_3/SiO_2$ | $SiO_2 + Al_2O_3$ | $Fe_2O_3 + CaO + MgO$ |
|---|---|---|---|
| Coal ash A | 0.56 | 91.4 | 7.5 |
| Coal ash B | 0.33 | 77.2 | 21.7 |
| Coal ash C | 0.58 | 89.3 | 8.1 |
| Expanded shale | 0.29 | 83.8 | 9.5 |
| Clay | 0.47 | 82.6 | 14.5 |

In Table 1, the Blaine specific surface area was measured according to JIS-R5201-81, and loss on ignition and chemical composition were determined according to JIS-R5202-81.

TABLE 2

| | (Properties of Molded Granules) | | | | |
|---|---|---|---|---|---|
| | Apparent Specific Gravity | Water Content (%) | Crushing Strength ($kgf/cm^2$) | | Wear Pulverization Ratio (%) |
| | | | 20° C. | 600° C. | |
| Example 1 | 1.1 | 20 | 0.5 | 1.1 | 10.2 |
| Example 2 | 1.35 | 5 | 0.7 | 0.6 | 16.5 |
| Example 3 | 1.47 | 5 | 1.3 | 1.9 | 6.5 |
| Example 4 | 1.48 | 5 | 1.6 | 1.9 | — |
| Example 5 | 1.55 | 5 | 2.4 | 3.3 | 2.8 |
| Example 6 | 1.26 | 21 | 3.2 | 3.1 | — |
| Com. Ex. 1 | 1.0 | 23 | 0.3 | 0.1 | 36.3 |
| Com. Ex. 2 | 2.6 | — | >50 | >50 | 0.6 |

In Table 2, the apparent specific gravity was determining according to JIS-M8716-77. The granulation water content is the amount of water added when granulated, and the figures represent % based on the amount of solid. The crushing strength was determined according to JIS-M8718-82 and shows values corresponding to a particle size of 10±1 mm. The values given in the column "20° C." in Table 2 are those obtained by determination on the granules at room temperature (20° C.) immediately after granulation, and the values given in the column "600° C." in Table 2 are those determined after heating the granules at 600° C. for 30 minutes.

Wear pulverization rate was measured to estimate the amount of the pulverized powder formed when the particles are rolled in the rotary kiln and worn therein. The wear pulverization rate means a ratio of the amount of the pulverized powder passing through the 2.5 mm sieve which is formed when the granules heated at 600° C. for 30 minutes are introduced into a porcelain pot mill (inner diameter: 0.21 m, length: 0.2 m) in such an amount as to give a retention ratio of 8 vol.% and the mill is rotated at a peripheral speed of 3.8 m/min for 45 minutes. In the case that the wear pulverization rate was a value of 10% or above in the Examples and Comparison Examples, a certain deposit was formed in the calcining zone in the calcining by the rotary kiln, and a long-term stable operation was difficulty done. In the case that granules exhibiting the value of 6% or below were used, almost no deposit was formed. Thus, the wear pulverization rate highly correlates with the crushing strength, for instance, the rate of 10% corresponds to a crushing strength of 0.5 $kgf/cm^2$ and the rate of 6% corresponds to about 1.5 $kgf/cm^2$ or above. Further, the crushing strength correlates with the wear pulverization rate of the particle caused by the handling of the granules in a transportation apparatus when introduced into the rotary kiln. It has been found from the pulverization rate in the feed system of the rotary kiln that the granule strength required for practical handling is 0.5 $kgf/cm^2$ or above, preferably 1.5 $kgf/cm^2$ or above in terms of crushing strength.

TABLE 3

| Material | $Al_2O_3/SiO_2$ | $SiO_2 + Al_2O_3$ | $Fe_2O_3 + CaO + MgO$ |
|---|---|---|---|
| Example 1 | 0.50 | 88.0 | 10.7 |
| Example 2 | 0.51 | 88.5 | 10.4 |
| Example 3 | 0.51 | 88.2 | 10.6 |
| Example 4 | 0.50 | 88.3 | 10.4 |
| Example 5 | 0.50 | 88.0 | 10.7 |
| Example 6 | 0.58 | 89.3 | 8.1 |
| Com. Ex. 1 | 0.51 | 88.5 | 10.4 |
| Com. Ex. 2 | 0.29 | 83.8 | 9.5 |

TABLE 4

| | (Properties of Resulting Aggregate) | | | | |
|---|---|---|---|---|---|
| | Specific Gravity | | Water Content (%) | 24 hr Water Absorption (%) | Crushing Strength ($kgf/cm^2$) |
| | Absolute Dry | Surface Dry | | | |
| Example 1 | 1.40 | 1.43 | 1.9 | 1.2 | 73 |
| Example 2 | 1.34 | 1.39 | 3.9 | 1.9 | 70 |
| Example 3 | 1.41 | 1.45 | 3.3 | 1.2 | 71 |
| Example 4 | 1.33 | 1.37 | 2.9 | 1.5 | 75 |
| Example 5 | 1.34 | 1.37 | 2.9 | 1.5 | 75 |
| Example 6 | 1.26 | 1.29 | — | 2.2 | 59 |
| Com. Ex. 1 | 1.19 | 1.24 | 4.2 | 2.5 | 51 |
| Com. Ex. 2 | 1.32 | 1.70 | 29.4 | 12.9 | 53 |

Evaluation as Lightweight Aggregate for Concrete Production

The artificial lightweight aggregates prepared in Examples 1–6 and Comparison Examples 1–2 were subjected to the concrete test according to JIS-A5002. JIS-A5002 defines the test conditions as follows: water/cement ratio=0.40, S/A=37−41, slamp=8±1 cm, fine aggregate: river sand. The results are shown in Table 5. The test defined by the JIS-A5002 is a test wherein the strength of mortar portion is increased so as to determine precisely the strength of the aggregate per se. For instance, this JIS standard prescribes that the 28 days' compression strength for MA-419 grade must be 400 $kgf/cm^2$ or above. It was found that the aggregate obtained by the Examples was superior in strength and corresponded to a grade having a crushing strength of 500 kgf/cm$^2$ or above which is beyond the description in the JIS (Japanese Industrial Standard).

TABLE 5

(Properties of Resulting Concrete)

| | Vol./Wt. Ready-Mixed (kg/l) | Tensile Strength (kgf/cm$^2$) | | Compression Strength (kgf/cm$^2$) | |
|---|---|---|---|---|---|
| | | 7th day | 28th day | 7th day | 28th day |
| Example 1 | 1.87 | 27.9 | 29.9 | 445 | 530 |
| Example 2 | 1.85 | 35.6 | 36.3 | 437 | 513 |
| Example 3 | 1.87 | 27.8 | 35.0 | 444 | 522 |
| Example 4 | 1.86 | 33.2 | 39.8 | 450 | 533 |
| Example 5 | 1.87 | 26.3 | 40.7 | 449 | 536 |
| Example 6 | — | — | — | — | — |
| Com. Ex. 1 | 1.87 | 28.3 | 34.8 | 366 | 395 |
| Com. Ex. 2 | 2.01 | 26.1 | 34.4 | 360 | 410 |

EXAMPLES 7–11

The essentially same procedure of Example 1 was repeated except that the raw material was replaced with that shown in Table 6 to prepare a molded granule.

The physical properties and the chemical compositions of the resulting granules are shown in Tables 7 and 8, respectively.

Then, artificial lightweight aggregates were prepared in the same manner as in Example 1 exept that the calcination conditions were replaced with those shown in Table 9.

The obtained artificial lightweight aggregates were subjected to the aggregate test. The test results are set forth in Table 10.

TABLE 6-1

(Raw Material)

| | Coal Ash (wt. ratio) | Additive (content) | Braine specific surface area (cm$^2$/g) |
|---|---|---|---|
| Example 7 | D + E (9:1) | Stack dust (4%) | 6560 |
| Example 8 | D + E (9:1) | Stack dust (4%) | 8880 |
| Example 9 | D + F (8:2) | Clay (5%) | 6370 |
| Example 10 | D + E (85:15) | Stack dust (2%) | 5530 |
| Example 11 | D + F (8:2) | Clay (5%) | 6180 |

TABLE 6-2

| | Chemical Composition (wt. %) | | | | | |
|---|---|---|---|---|---|---|
| Material | ig. loss | SiO$_2$ | Al$_2$O$_3$ | Fe$_2$O$_3$ | MgO + CaO | Na$_2$O + K$_2$O |
| Coal ash D | 3.2 | 56.5 | 32.2 | 4.2 | 1.6 | 1.3 |
| Coal ash E | 1.3 | 49.4 | 23.8 | 8.1 | 3.0 | 3.7 |
| Coal ash F | 3.9 | 60.6 | 19.8 | 3.8 | 9.1 | 1.4 |
| Stack dust | 10.3 | 13.9 | 4.8 | 2.7 | 45.4 | 4.4 |
| Clay | 9.5 | 61.5 | 18.6 | 7.0 | 1.1 | 1.6 |

TABLE 6-3

| Material | Al$_2$O$_3$/SiO$_2$ | SiO$_2$ + Al$_2$O$_3$ | Fe$_2$O$_3$ + CaO + MgO |
|---|---|---|---|
| Coal ash D | 0.57 | 91.6 | 6.0 |
| Coal ash E | 0.33 | 83.7 | 13.4 |
| Coal ash F | 0.48 | 74.2 | 19.9 |
| Stack dust | 0.35 | 20.9 | 53.9 |
| Clay | 0.30 | 88.5 | 9.0 |

TABLE 7

(Properties of Molded Granules)

| | Apparent Specific Gravity | Crushing Strength (kgf/cm$^2$) | |
|---|---|---|---|
| | | 20° C. | 600° C. |
| Example 7 | 1.62 | 1.1 | 3.0 |
| Example 8 | 1.65 | 1.3 | 3.5 |
| Example 9 | 1.52 | 1.0 | 2.8 |
| Example 10 | 1.38 | 0.8 | 3.3 |
| Example 11 | 1.48 | 0.9 | 3.5 |

TABLE 8

| Material | Al$_2$O$_3$/SiO$_2$ | SiO$_2$ + Al$_2$O$_3$ | Fe$_2$O$_3$ + CaO + MgO |
|---|---|---|---|
| Example 7 | 0.54 | 83.8 | 9.5 |
| Example 8 | 0.54 | 83.8 | 9.5 |
| Example 9 | 0.51 | 86.7 | 8.5 |
| Example 10 | 0.54 | 84.5 | 9.4 |
| Example 11 | 0.51 | 86.7 | 7.2 |

TABLE 9

(Calcination Conditions)

| | Calcination Temp. | Rate of Tem. Increase |
|---|---|---|
| Example 7 | 1,290 | 600° C./hr |
| Example 8 | 1,280 | 600 |
| Example 9 | 1,320 | 600 |
| Example 10 | 1,280 | 400 |
| Example 11 | 1,310 | 400 |

TABLE 10

(Properties of Resulting Aggregate)

| | Absolute Dry Specific Gravity | 24 hr Water Absorption (%) | 30 atm Water Absorption (%) | Crushing Strength (kgf/cm$^2$) |
|---|---|---|---|---|
| Example 7 | 1.35 | 1.8 | 9.1 | 72 |
| Example 8 | 1.32 | 0.8 | 6.3 | 80 |
| Example 9 | 1.25 | 0.8 | 6.3 | 73 |
| Example 10 | 1.36 | 1.2 | 7.5 | 76 |
| Example 11 | 1.39 | 0.8 | 6.0 | 85 |

Evaluation as Lighweight Aggregate for Concrete Production

The artificial lightweight aggregate prepared in Examples 7, 10 and 11 were subjected to the concrete test for the determination of compression strength at 28th day according to the aforementioned JIS-A5002. The results are as follows:

Example 7: 505 kgf/cm$^2$
Example 10: 568 kfg/cm$^2$
Example 11: 595 kgf/cm$^2$

What is claimed is:

1. A process for producing an artificial lightweight aggregate comprising SiO$_2$, Al$_2$O$_3$, Fe$_2$O$_3$ and at least one oxide selected from the group consisting of MgO and CaO which has an absolute dry specific gravity of not higher than 1.5, a crushing strength of not less than 55 kgf/cm$^2$ and a 24 hour water-absorption ratio of not greater than 2.4%, which comprises:

granulating a raw powder material comprising SiO$_2$, Al$_2$O$_3$, Fe$_2$O$_3$ and at least one oxide selected from the group consisting of MgO and CaO, in which the total amount of SiO$_2$ and Al$_2$O$_3$ is from 75 to 92 wt.%, the weight ratio of Al$_2$O$_3$/SiO$_2$ is from 0.25 to 0.70, and the total amount of Fe$_2$O$_3$ and MgO and/or CaO is from 6-20 wt.% and containing at least 80% by weight of a coal ash having a Blaine specific surface area of 2,000 to 9,000 cm²/g to give granules having an average apparent specific gravity of 1.1 to 1.8 and a crushing strength of 0.5 kgf/cm² or above at 20° C. as well as after heating at 600° C.; and calcining the granules at a temperature of 1,100° to 1,600° C. by heating the granules to said temperature at a rate of 150° C./hour to 1000° C./hour when heating said granules from 600° C. to said temperature.

2. The process for producing an artificial lightweight aggregate as claimed in claim 1, wherein said granulation is performed by compression molding.

3. The process for producing an artificial light-weight aggregate as claimed in claim 1, wherein the calcining at 1,100° to 1,600° C. is continued for a period of from 30 to 120 minutes.

4. The process for producing an artificial light-weight aggregate as claimed in claim 2, wherein the calcining at 1,100° to 1,600° C. is continued for a period of from 30 to 120 minutes.

5. The process for producing an artificial light-weight aggregate as claimed in claim 4, wherein the crushing strength of said granule is not less than 1.5 kgf/cm² or above at 20° C. as well as after heating at 600° C.

6. The process for producing an artificial light-weight aggregate as claimed in claim 5, wherein said granule has an apparent specific gravity of from 1.2 to 1.6.

7. The process for producing an artificial light-weight aggregate as claimed in claim 3, wherein said granule has an apparent specific gravity of from 1.2 to 1.6.

* * * * *